United States Patent [19]
Yoshida et al.

[11] 3,973,388
[45] Aug. 10, 1976

[54] LIQUID CRYSTAL DISPLAY CELL

[75] Inventors: Masateru Yoshida, Tanashi; Minoru Natori, Saitama, both of Japan

[73] Assignee: Citizen Watch Co., Ltd., Tokyo, Japan

[22] Filed: Mar. 12, 1975

[21] Appl. No.: 557,613

[30] Foreign Application Priority Data
Mar. 18, 1974  Japan............................ 49-31072

[52] U.S. Cl................. 58/50 R; 240/6.43; 350/160 LC; 428/1; 428/215; 428/337; 428/913; 40/52 R; 40/130 R
[51] Int. Cl.².................. G04B 19/30; C09K 3/34
[58] Field of Search ............... 428/1, 213, 215, 337, 428/913; 350/160 LC; 240/6.43; 58/50 R

[56] References Cited
UNITED STATES PATENTS

| | | |
|---|---|---|
| 3,585,381 | 6/1971 | Hodson et al............................ 428/1 |
| 3,592,726 | 7/1971 | Blizard................................ 428/215 |
| 3,781,087 | 12/1973 | Nagasaki....................... 350/160 LC |
| 3,801,423 | 4/1974 | Van Laethem..................... 428/213 |
| 3,802,945 | 4/1974 | James..................................... 428/1 |

*Primary Examiner*—Marion E. McCamish
*Assistant Examiner*—William R. Dixon, Jr.
*Attorney, Agent, or Firm*—Spensley, Horn & Lubitz

[57] ABSTRACT

A liquid crystal, electrochromic or other electro-optical material is sandwiched between two glass substrates. An electric field is applied to the electro-optical material to display time and other information on a watch. The lower glass substrate is thinner than the upper substrate so as to create clear displays and to enable the manufacture of a thin watch which is also light weight and shock resistant.

8 Claims, 5 Drawing Figures

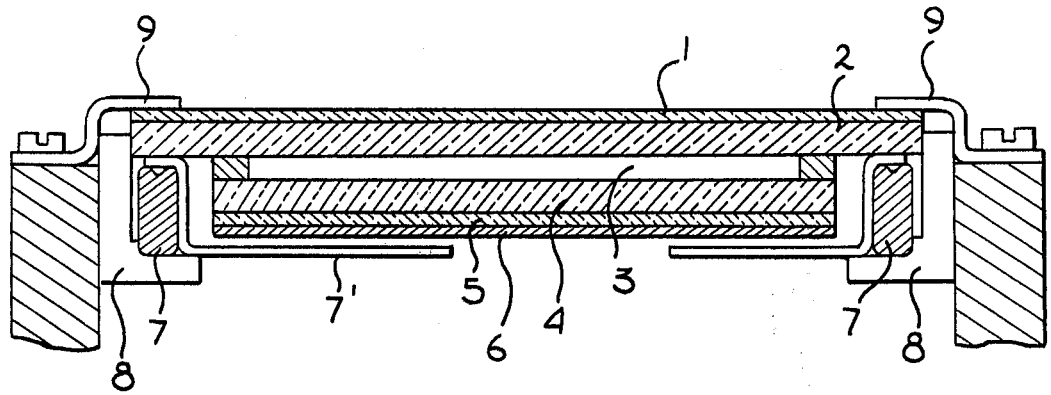
PRIOR ART  *Fig. 1*
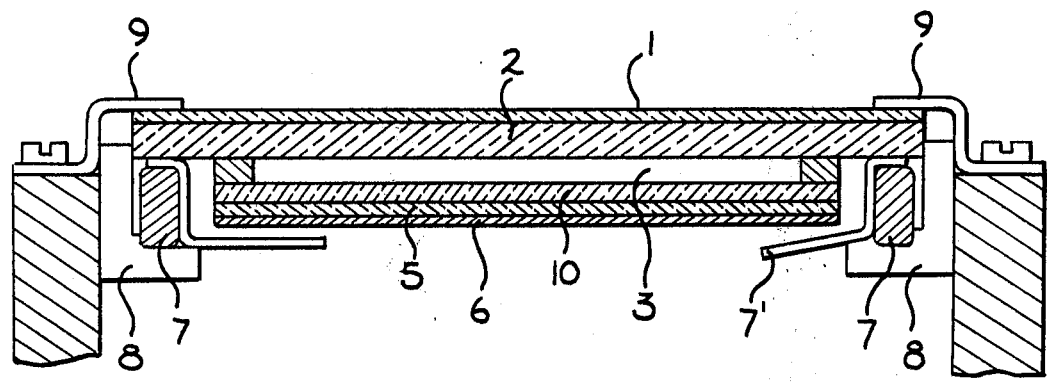
*Fig. 2*

LIQUID CRYSTAL DISPLAY CELL

BACKGROUND OF THE INVENTION

1. Field of the Invention

The present invention generally relates to timepieces, and more particularly to a liquid crystal display cell for a wristwatch.

2. Prior Art

Liquid crystals used in display devices are divided into two varieties, the first being the kind which performs display functions by means of a light scattering effect upon the application of an electric field, and the other being the kind used in recent years which performs display functions by means of a polarization plate having a specific dielectric anisotropy disposed on both surfaces of a liquid crystal cell to polarize the ray of light.

In a timepiece employing a liquid crystal display device, an oscillator, particularly a liquid crystal oscillator, is generally preferred as it is a highly accurate component. Since the liquid crystal oscillator has a generally high oscillation frequency, it normally comprises, besides an oscillator circuit, an integrated circuit for dividing the frequency, a display decoder circuit, an external power switching device, etc. Because of the various components of the oscillator, prior art watches cannot be manufactured sufficiently thin and compact when compared with a mechanical watch. Moreover, when additional devices are to be accommodated in a watch to perform other functions, such as an alarm device, timing devices required for use in sports, and the like, each component part must of necessity be miniaturized because of the large amount of space taken up by the oscillator.

Except for exterior parts of a watch, the liquid crystal display device is the largest component in a watch. Therefore, achieving certain thinness for a liquid crystal display device would enable the manufacture of a compact, thin watch. A sturdy, lightweight, thin device is also desirable since the liquid crystal cell must be periodically changed.

BRIEF SUMMARY OF THE INVENTION

It is therefore an object of the present invention to provide a compact, thin liquid crystal display device suitable for timepieces, particularly wristwatches.

Another object of the present invention is to provide a liquid crystal display device which produces distinct displays for easy reading.

The novel features which are believed to be characteristic of the invention, both as to its organization and method of operation, together with further objectives and advantages thereof will be better understood from the following description considered in connection with the accompanying drawings in which a presently preferred embodiment of the invention is illustrated by way of example. It is to be expressly understood, however, that the drawings are for the purpose of illustration and description only, and are not intended as a definition of the limits of the invention.

BRIEF DESCRIPTION OF THE DRAWINGS

FIG. 1 is a cross-sectional view of a conventional field effect polarizing liquid crystal cell.

FIG. 2 is a cross-sectional view of the isotropic effect polarizing liquid crystal cell of the present invention.

DETAILED DESCRIPTION OF THE INVENTION

Figure 3:
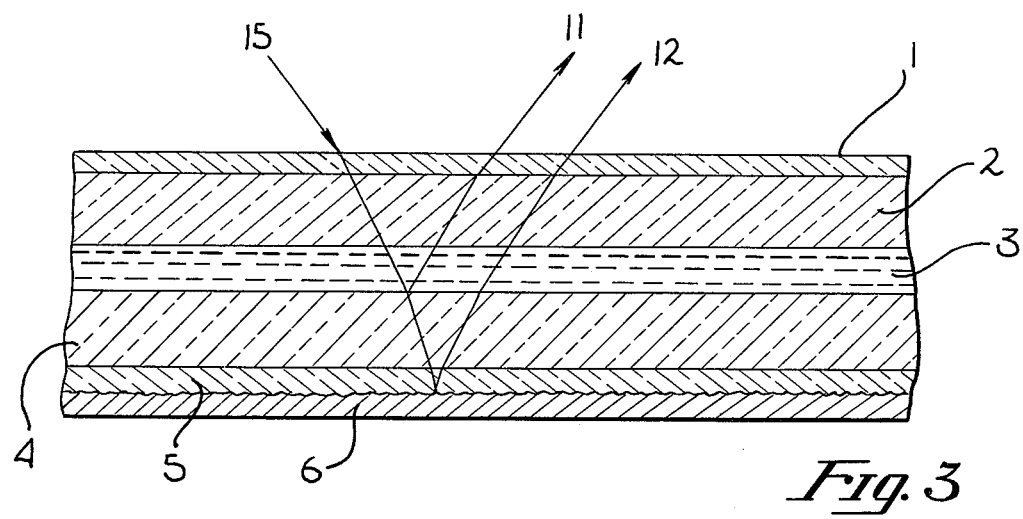
FIG. 3 is a cross-sectional view of the liquid crystal cell shown in FIG. 1, illustrating the entry of a ray of light into the cell and its reflections.

Referring first to FIG. 1, a conventional prior art field effect polarizing liquid crystal cell comprises a top polarization plate 1, an upper glass substrate 2, a liquid crystal layer 3, a lower glass substrate 4, a bottom polarization or deflecting plate 5, and a reflector 6. In such a cell, the glass substrates 2 and 4 are identical in thickness, and the entire cell is held together by the upper glass substrate 2 in combination with the supporting parts 7, 7', 8 and 9.

Inasmuch as the lower glass substrate 4 merely sandwiches the liquid crystal layer 3, the actual strength is needed only for the upper glass substrate 2. For this reason and in accordance with the aforementioned object of making the display device as compact and as thin as possible, the present invention uses a much thinner lower glass substrate than the upper substrate, as shown in FIG. 2.

FIG. 2 is a cross-sectional view of the preferred embodiment of the present invention showing an isotropic effect polarizing liquid crystal cell, in which a lower glass substrate 10 is fabricated substantially thinner than an upper glass substrate 2, the cell being supported entirely by the comparatively thicker upper glass substrate 2. Such composition not only results in a thinner liquid crystal wristwatch but also results in a lightweight liquid crystal display cell which lessens chances of damage to the supporting parts from shock. Another advantage achieved by the present invention is that the liquid crystal cell produces a clearer, more legible display as described hereinafter. In this particular invention, one can see that identification of the problems, namely, those of size and clarity of display do not point to the simple, yet effective solution. By substantially reducing the thickness of the lower glass substrate 10 without any reduction in the thickness of the upper substrate 2, strength is maintained and the shortcomings of the prior art are overcome.

Referring to FIG. 3, which is a cross sectional view of the conventional liquid crystal cell shown in FIG. 1, an incident ray of light 15 entering the liquid crystal cell is reflected by a typical irregular reflector plate 6. As reflecting ray 12 passes through polarizing liquid crystal layer 3 and polarization plate 5, an electric field is applied to the polarizing liquid crystal layer 3. That portion which received the electric field is displayed as the light is reflected back from reflector plate 6. In this case, the incident ray 15 also creates a ray of light 11 when reflected by the surface of glass substrate 4. Since this ray 11 must also pass through the liquid crystal layer 3, an image created by ray 11 will also appear on display.

Figure 5:
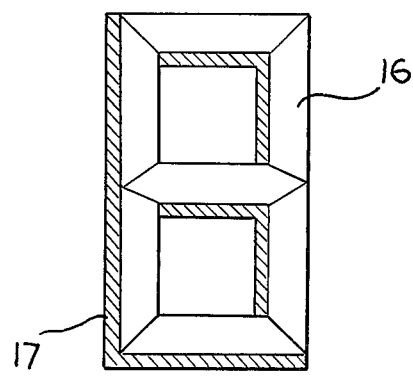
FIG. 5 shows a shadow accompanying a display.

This condition is illustrated in FIG. 5, in which an image 16 is a display from the proper ray of light 12, and an image 17 is a shadow created by the unnecessary ray of light 11 reflecting from the surface of glass substrate 4. FIG. 5 shows the numeral "8" as it would appear on the display cell. The shadowed area 17 surrounds part of the numeral tending to obscure it. This obscured area 17 is due to the undesired light ray 11.

Figure 4:
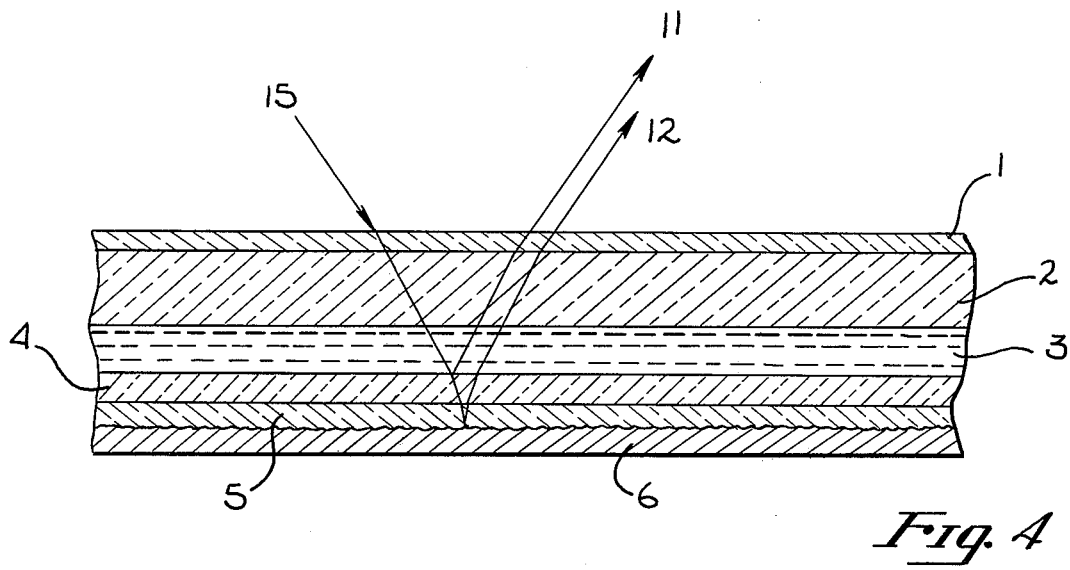
FIG. 4 is a cross-sectional view of the liquid crystal display cell shown in FIG. 2, illustrating a narrow gap between the reflected rays.

The presence of this undesired shadow 17 also renders the legitimate display 16 difficult to be read, and the farther away the shadow 17 appears, the harder to read the regular display 16, giving the viewer an unpleasant feeling. Since the unnecessary shadow 17 is caused by a difference in the passage of rays 12 and 11, the present invention minimizes the aforementioned difference by fabricating the lower glass substrate 4 as thin as possible, as shown in FIG. 4. When the thickness of the substrate 4 is less than about 0.4 mm, preferably 0.3 mm –0.2 mm, the unnecessary shadow 17 is practically indistinguishable.

As described above, the liquid crystal display cell of the present invention facilitates the manufacture of a lightweight, thin wristwatch with an improved legibility of displays.

Although this invention has been disclosed and described with reference to a particular embodiment for use in a wristwatch, the principles involved are susceptible of other applications which will be apparent to persons skilled in the art. This invention, therefore, is not intended to be limited to the particular embodiment herein disclosed.

We claim:

1. An electro-optical watch display cell having an electro-optic material selected from the group consisting of the liquid crystal, electrochromic, and other electro-optical types, said cell having an upper glass substrate and a lower glass substrate, said upper and lower glass substrates sandwiching said electro-optical material thereinbetween, said glass substrates arranged and configured such that said upper substrate supports said electro-optical display cell in said watch, and wherein said lower glass substrate is sufficiently thin so as to substantially reduce the formation of undesired shadow images.

2. The electro-optical watch display cell according to claim 1 wherein said display cell is arranged in the shape of a numeral.

3. The electro-optical watch display cell according to claim 1 wherein said display cell is arranged in the shape of a letter.

4. The electro-optical display cel according to claim 1, wherein the thickness of said lower glass substrate is less than 0.4 mm.

5. The electro-optical display cell according to claim 1, wherein, in addition thereto, first and second polarization plates are disposed in said display cell, said first polarization plate disposed above said upper glass substrate and said second polarization plate disposed beneath said lower glass substrate.

6. In a watch, an electro-optical display cell arranged to visually indicate predetermined information, said display cell having a reflector, a bottom polarization plate disposed on said reflector, a lower glass substrate disposed on said polarization plate, a liquid crystal layer disposed on said lower glass substrate, an upper glass substrate disposed on said liquid crystal layer, and a top polarization plate disposed on said upper glass substrate; wherein the improvement comprises said upper glass substrate coupled to said watch and having a thickness sufficient to support the entire display cell and said lower glass substrate being sufficiently thin so as to substantially reduce the formation of undesired shadow images.

7. The electro-optical display cell according to claim 6 wherein said lower glass substrate has a thickness less than 0.4 mm.

8. The electro-optical display cell according to claim 6 wherein said lower glass substrate has a thickness of about 0.3 mm –0.2 mm.

* * * * *